Oct. 11, 1927.

E. GARCIA 1,644,671

AUTOMOBILE BRAKE MECHANISM

Filed Jan. 16, 1926

Inventor
E. Garcia
By Clarence A. O'Brien
Attorney

Patented Oct. 11, 1927.

1,644,671

UNITED STATES PATENT OFFICE.

EMILIO GARCIA, OF NEW YORK, N. Y.

AUTOMOBILE BRAKE MECHANISM.

Application filed January 16, 1926. Serial No. 81,795.

My present invention has to do with brake mechanisms of automobiles; and it contemplates the provision of a brake mechanism in which by means under the control of the driver of an automobile the rotation of the propeller shaft is utilized to powerfully apply the brakes, and this with but little effort on the part of the driver.

Other objects and practical advantages of the invention will be fully understood from the following description and claims when the same are read in connection with the drawings, accompanying and forming part of this specification, in which:—

Similar numerals of reference designate corresponding parts in all of the views of the drawings.

Figure 1:
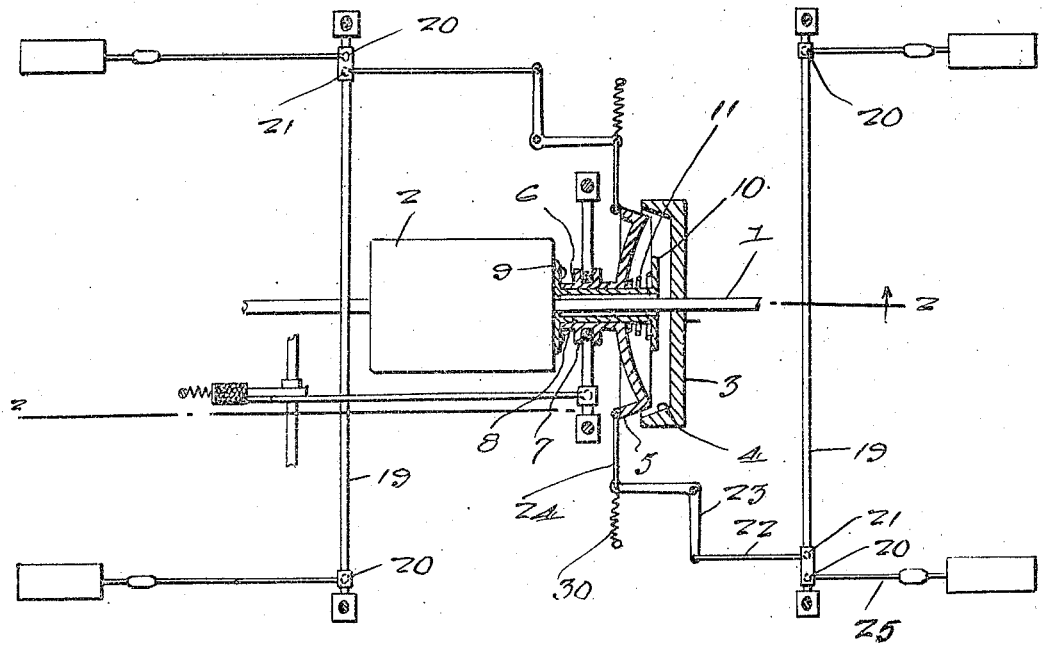
Figure 1 is a view diagrammatic in character and partly in plan and partly in section illustrating the preferred embodiment of my invention.
Figure 2:
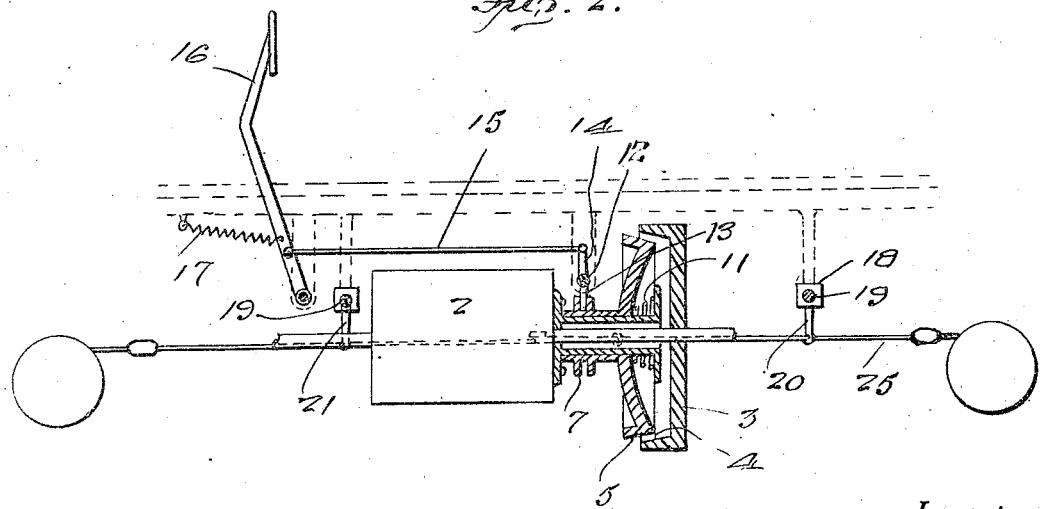
Figure 2 is a view partly in elevation and partly in section taken at right angles to Figure 1.

I show in the drawings a propeller shaft 1 extending from a transmission casing 2, and it will be understood that a female fly wheel 3 is fixed to and arranged to rotate with the shaft 1. Opposed to the fly wheel 3 the inner portion of which is tapered as designated by 4, is a complementary, tapered, male clutch member 5. The clutch member 5 is rotatable with a sleeve 6 having a circumferentially grooved portion 7, and the said sleeve 6 is mounted on a tubular projection 8, having at one end a flange 9 fixed to the casing 2 and also having at its opposite and rear end a flange 10 between which and the clutch member 5 is interposed an expansion spring 11, the said spring 11 tending, of course, to move the clutch member 5 forwardly or away from the fly wheel 3. A rock shaft 12 is appropriately mounted above the sleeve 6, Figure 2, and said shaft 12 is provided with a yoke 13 engaging the circumferentially grooved portion of the sleeve 6 and is also provided with a crank 14. This latter is connected through a rod 15 with a pedal lever 16 subject to the action of a retractile spring 17. Thus when the pedal lever 16 is moved forwardly through the medium of the foot of the automobile driver, the clutch member 5 will be thrust against the action of the spring 11 into frictional engagement with the fly wheel 3, and will be turned with and by the said fly wheel 3. When, however, the pedal lever 16 is relieved of pressure the expansion of the spring 11 will operate to quickly and positively disengage the clutch member 5 from the fly wheel 3.

Appropriately mounted at 18 are transverse brake shafts 19 provided with pendent cranks 20 and also provided with an additional crank 21. The cranks 21 are connected through rods 22 with the outwardly directed arm of bell cranks 23, and the inner arms of the said bell cranks 23 are connected through rods 24 with the clutch member 5. Thus when the said clutch member 5 is turned through the medium of the fly wheel 3 as before described, the bell cranks 23 will be rocked as will also the brake shafts 19, whereupon the brake shafts pulling on cables or other appropriate connections 25 will apply the brake proper of the four wheels of the automobile, which brake proper may be of conventional construction or of any construction consonant with the purpose of my invention.

When deemed expedient, retractile springs 30 are connected to the inner arms of the bell cranks 23 and to the frame of the automobile so as to assist in releasing the brake when the clutch member 5 is disengaged from the fly wheel member 3 as before described.

Manifestly the element 3 will operate as a fly wheel only when the automobile is running, and it will be understood that the faster the car is propelled the more effective will be the action of my novel brake mechanism when the same is put into use. Again it will be understood that but little effort on the part of the driver is necessary to the operation of my novel brake mechanism, the movement of the pedal lever 16 serving merely to engage the clutch member 5 with the fly wheel 3, and the rotation of the said fly wheel 3 being utilized for the forcible and prompt application of the brake.

Notwithstanding the practical advantage ascribed to my novel brake mechanism, it will be appreciated that the said mechanism is simple and compact in construction and in general is well adapted to withstand the usage and exposure to which automobile appurtenances are ordinarily subjected.

I have entered into a detailed description of the construction and relative arrangement of the parts embraced in the present and preferred embodiment of my invention in order to impart a full, clear and exact understanding of the said embodiment. I do not desire, however, to be understood as limiting myself to the precise construction and arrangement of parts as disclosed, my invention being defined by my appended claims within the scope of which changes in structure and changes in arrangement may be made without departure from my invention.

Having described my invention, what I claim and desire to secure by Letters Patent, is:—

1. In an automobile and in combination, wheel brakes, a propeller shaft, a fly wheel fixed to and rotatable with said shaft and constituting the female member of the friction clutch, a male friction clutch member complementary to and arranged to cooperate with said fly wheel, operator controlled means for moving said male clutch member into frictional engagement with said female member and fly wheel, spring means for disengaging the male clutch member from the female clutch member and fly wheel, and means connecting the male clutch member and the wheel brakes, whereby rotation or turning of the male clutch member will be attended by application of the wheel brakes; the said propeller shaft being associated with a transmission casing, a tubular support surrounding said shaft and fixed to and projecting from said casing, and a sleeve connected to the male clutch member and also connected with the operative controlling means, and the said tubular support being provided with an abutment in rear of the male clutch member, said spring means being interposed between said abutment and said male clutch member.

2. In an automobile and in combination, wheel brakes, a transverse brake shaft connected with said wheel brakes, and rockable, a transmission casing, propeller shaft, a fly wheel fixed to and rotatable with said propeller shaft and constituting one member of a friction clutch, a tubular support carried by and extending from the transmission casing and surrounding the propeller shaft and having an abutment at its rear end, a sleeve movable rectilinearly and about said tubular support, a friction clutch member fixed to said sleeve, a spring surrounding said tubular support and interposed between the abutment thereof and the last named friction clutch member, a bell crank, a connection between said bell crank and the brake shaft for operating the latter by the former, a connection between the last-named friction clutch member and the bell crank for operating the latter by the former, and operator controlled means connected with the last-named friction clutch member for moving the same against the action of said spring into engagement with the first-named friction clutch member.

3. In an automobile and in combination, wheel brakes, a transverse brake shaft connected with said wheel brakes, and rockable, a transmission casing, said propeller shaft and constituting one member of a friction clutch, a tubular support carried by and extending from the tansmission casing and surrounding the propeller shaft and having an abutment at its rear end, a sleeve movable rectilinearly and about said tubular support, a fricion clutch member fixed to said sleeve, a spring surrounding said tubular support and interposed between the abutment thereof and the last named friction clutch member, a bell crank, a connection between said bell crank and the brake shaft for operating the latter by the former, a connection between the last named friction clutch member and the bell crank for operating the latter by the former, and operator controlled means connected with the last-named friction clutch member for moving the same against the action of said spring into engagement with the first-named friction clutch member; the said spring being supplemented by a retractile spring interposed between and connected to the bell crank and the automobile frame.

In testimony whereof I affix my signature.

EMILIO GARCIA.